United States Patent [19]

Nishi et al.

[11] Patent Number: 4,982,290
[45] Date of Patent: Jan. 1, 1991

[54] DIGITAL ELECTRONIC STILL CAMERA EFFECTING ANALOG-TO-DIGITAL CONVERSION AFTER COLOR BALANCE ADJUSTMENT AND GRADATION CORRECTION

[75] Inventors: Seiki Nishi; Mikio Watanabe, both Tokyo, Japan

[73] Assignee: Fuji Photo Film Co., Ltd., Kanagawa, Japan

[21] Appl. No.: 301,118

[22] Filed: Jan. 25, 1989

[30] Foreign Application Priority Data

Jan. 26, 1988 [JP]  Japan .................................. 63-13578

[51] Int. Cl.⁵ ......................... H04N 9/79; H04N 9/73
[52] U.S. Cl. ....................................... 358/310; 358/29; 358/909
[58] Field of Search ................. 358/212, 32, 228, 335, 358/75, 76, 77, 33, 332, 244, 244.1, 244.2, 213.19, 909, 906, 211, 213.13, 310, 29; 360/33.1, 35.1, 10.1, 10.2, 10.3

[56] References Cited

U.S. PATENT DOCUMENTS

| | | | |
|---|---|---|---|
| 4,456,931 | 6/1984 | Toyoda et al. | 358/335 |
| 4,485,413 | 11/1984 | Furuta | 358/77 |
| 4,571,626 | 2/1986 | Yamada | 358/212 |
| 4,633,330 | 12/1986 | Yamamitsu et al. | 360/32 |
| 4,639,770 | 1/1987 | Jung et al. | 358/76 |
| 4,689,678 | 8/1987 | Klemmer | 358/33 |
| 4,769,694 | 9/1988 | Oshikoshi | 358/75 |
| 4,794,460 | 12/1988 | Shiota | 358/332 |
| 4,805,010 | 2/1989 | Shroyer et al. | 358/29 |
| 4,825,293 | 4/1989 | Kobayashi et al. | 358/228 |
| 4,914,746 | 4/1990 | Nishi et al. | 358/334 |

FOREIGN PATENT DOCUMENTS 59-183592 10/1984 Japan .

OTHER PUBLICATIONS

"Fully Digitized Electronic Still Camera", the Journal of the Institute of Television Engineers of Japan, vol. 37, No. 10 pp. 863–868 (1983).

Primary Examiner—Robert L. Richardson

[57] ABSTRACT

A digital electronic still camera is provided in which a video signal representing a still picture is stored in the form of digital data which includes an imaging unit having an imaging device with an array of photosensitive cells and a color filter having separated-color segments arranged thereon. An object scene is shot by use of the imaging device to produce a video signal representing the object scene. The camera includes a color balance adjusting circuit for adjusting a color balance of the video signal produced from the imaging device, a gradation correction circuit for correcting a gradation of the video signal having the color balance adjustment performed thereon, a signal converter for converting the video signal delivered from the gradation correcting circuit to produce a digital signal, and a controller for controlling the imaging unit, the color balance adjustment circuit, the gradation correcting circuit, and the signal converter. Thereby a shooting operation, a color balance adjustment, a gradation correction and a conversion of a video signal into a digital signal may be effected, and a control signal for causing a digital video signal to be stored may be produced.

23 Claims, 7 Drawing Sheets

DIGITAL ELECTRONIC STILL CAMERA EFFECTING ANALOG-TO-DIGITAL CONVERSION AFTER COLOR BALANCE ADJUSTMENT AND GRADATION CORRECTION

BACKGROUND OF THE INVENTION

1. Field of the Invention

The present invention relates to an electronic still camera, and in particular, to a digital electronic still camera in which a video signal representing a still image is stored in the form of digital data.

2. Description of the Related Art

In an example, an electronic still camera described in the Japanese Patent Laid-Open Publication No. 183592/1984 includes a memory detachably connectable to the body of the camera having an imaging optical system and a solid-state imaging device such that a video signal representing a still picture produced by the imaging device is stored in the form of a digital signal in the memory. The memory loaded with the video signal may be removed from the electronic still camera and may then be installed in a playback apparatus such that the video signal read out of the memory is reproduced in the form of a visible image on a screen of a video monitor.

In usual cases, a difficulty arises in appropriately using the video signal produced from a color solid-state imaging device in the original form. More specifically, video signal processing is required to achieve, for example, a gradation correction such as a gamma, γ, correction and a color adjustment such as a white balance adjustment. In the conventional electronic still camera system, such video signal processing has been accomplished in a playback apparatus.

It has been well known that the video signal produced from the solid-state image pickup device is an analog signal. Conventionally, in a digital still camera, the correction of the γ characteristic and the white balance adjustment develop a digital signal into which the video signal attained from the imaging device is converted. For details, reference is made to, for example. Ohnishi, et al, "Fully Digitized Electronic Still Camera", the Journal of The Institute of Television Engineers of Japan, Vol. 37, No. 10, pp. 863–868 (1983) and U.S. Pat. No. 4,914,746 to Nishi et al.

In an ordinary analog-to-digital conversion, for the input signals, the size of the quantization step does not vary between the levels thereof, namely, the same step size is adopted for the low-level and high-level signals. In addition, the γ correction is achieved so as to be emphasized on the low-level signal as compared with the high-level signal. As a consequence, when the γ correction is conducted to a digital signal into which a signal is converted, the quantization error may excessively be emphasized for the signal having a small amplitude, and hence the played back picture is produced with coarse gradation levels.

In the solid-state imaging device, the sensitivity to an incident light of each cell constituting a photosensitive cell array thereof varies depending on the separated colors of filter segments from a color filter. In order to remove the difference in sensitivity, the white balance adjustment is conducted on the video signal. In a video signal obtained from an imaging or photosensitive cell associated with a color segment having a low transimissivity to the incident light, for example, the blue segment, the signal level is relatively lower than the level of signals associated with the remaining segments. As a consequence, when converting such a low-level signal into a digital signal by an analog-to-digital converter, the dynamic range thereof cannot be effectively utilized, and hence, even if the white balance adjustment is achieved thereafter, the signal-to-noise ratio, S/N, thereof is lowered as a result.

SUMMARY OF THE INVENTION

It is therefore an object of the present invention to provide a digital electronic still camera in which an appropriate video signal processing is conducted so as to attain a satisfactory picture quality, thereby solving the problems discussed above.

According to an embodiment of the present invention, a video signal in an analog form produced from a color solid-state imaging device is subjected to a video signal processing so that the signal is converted into a digital signal, which enables an dynamic range of the analog-to-digital signal converter to be efficiently used, thereby accomplishing the object set out above.

Accordingly to an embodiment of the present invention, a digital electronic still camera in which a video signal representing a still picture is stored in the form of digital data comprises imaging means including an imaging device having an array of photosensitive cells on which a color filter having separated-color segments is arranged for shooting an object scene to produce a video signal representing the object scene, color balance adjusting means for adjusting a color balance of the video signal produced from the imaging means, gradation correcting means for correcting a gradation of the video signal with the color balance adjustment performed thereon, signal converting means for converting the video signal produced from the gradation correcting means and developing a digital signal, and control means for controlling the imaging means, the color balance adjusting means, the gradation correcting means and the signal converting means so as to effect a shooting operation, a color balance adjustment, a gradation correction and a conversion of a video signal into a digital signal, and to produce a control signal for causing the digital video signal to be stored.

BRIEF DESCRIPTION OF THE DRAWINGS

The objects and features of the present invention will become more apparent from the consideration of the following detailed description taken in conjunctio with the accompanying drawings in which.

DESCRIPTION OF THE PREFERRED EMBODIMENTS

Referring now to the accompanying drawings, a detailed descriptionn will be given for the embodiments of a digital electronic still camera according to the present invention.

Figure 1:
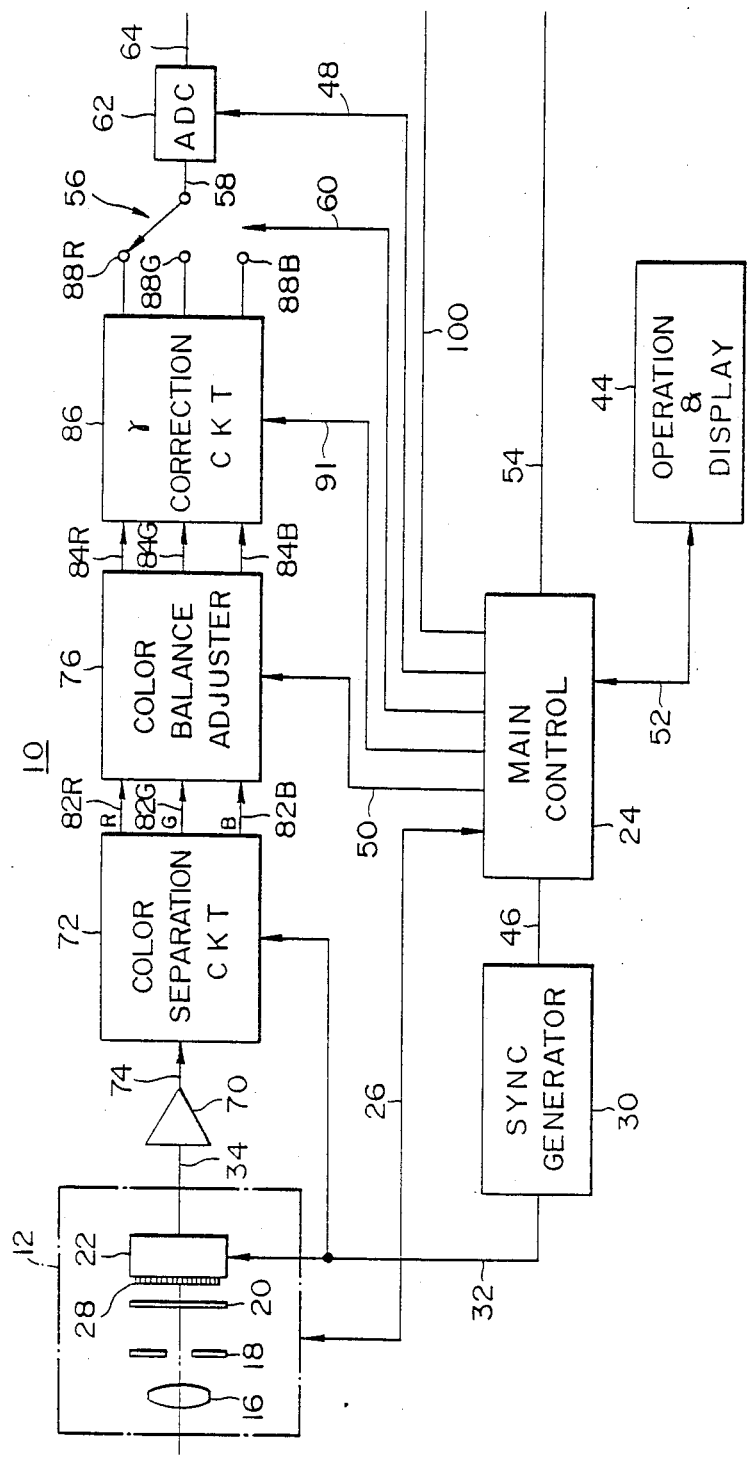
FIGS. 1 and 2 are functional block diagrams schematically illustrating an embodiment of a digital electronic still camera according to the present invention.
Figure 2:
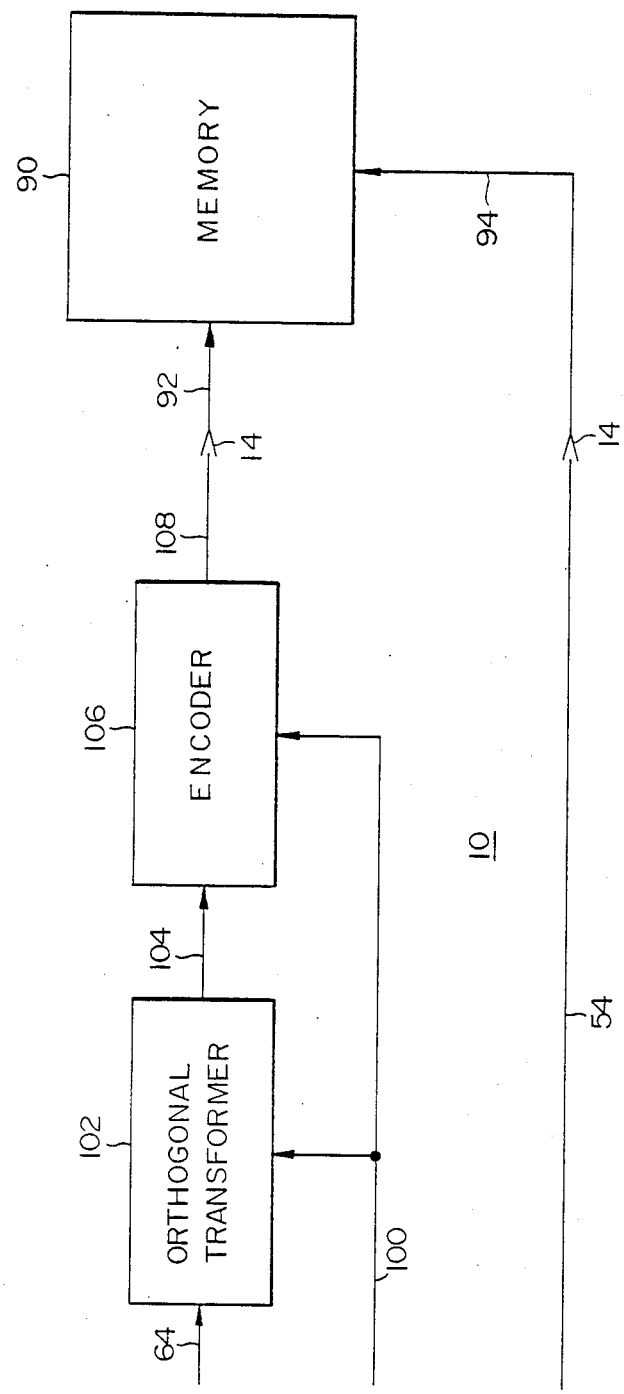

Referring to FIGS. 1 and 2, there is illustrated an embodiment of a digital electronic still camera according to the present invention including a camera 10 having an imaging unit 12 and a memory 90 which may be detachably connected via a connector 14 to the camera 10. Alternatively, the memory 90 may be fixedly connected to the camera 10. In a case where the memory 90 is detachable, there may be additionally disposed a buffer memory in the camera 10. The memory may be, in place of a semiconductor memory, for example, in the form of other types of storage such as a storage employing magnetic recording. In those figures, the components on the left-hand side with respect to the connector 14 are mounted as a digital electronic still camera in a single housing.

The memory 90 is a rewritable digital storage in which, for example, a semiconductor SRAM is mounted in the form of a module such as an integrated circuit (IC) card or cartridge. A data input/output line 92 is linked to the memory 90 of which a control bus 94 associated with an address signal, a read/write enable signal, a chip select signal, a strobe signal an a clock signal is connected via the connector 14 to the camera 10. Incidentally, the connector 14 may include a power supply line for the memory 90. For the memory 90, when a frame picture is represented by data of one megabit through 1.5 megabits, in a case of a SRAM having a storage capacity of 16 megabits per chip, there is implemented a storage of 24 frames by use of two chips.

The imaging unit 12 includes, as illustrated in the figures, an imaging lens 16, an iris 18, an optical shutter 20, an imaging device 22, a light-intensity/distance measuring mechanism, a viewfinder, not illustrated and other components such as a driving mechanisms thereof necessary for a shooting operation of a still picture. Focusing of the imaging lens 16, control of the iris 18, and the open and close operations of the shutter 20 are controlled through a control line 26 from a controller 24. The imaging device 22 may employ, for example, a solid-state imaging device such as a charge-coupled device, CCD, or metal oxide semiconductor, or an image pickup tube. In a case of a color solid-state imaging device, a color filter 28 is attached to an array of photosensitive cells such that in response to a clock received from a sync generator 30 on a drive line 32, a video signal having a color modification performed thereon is supplied to an output 34 thereof in a pixel sequential manner. The color segment arrangement is arbitrarily determined for the color filter.

The video signal output 34 from the imaging device 22 is connected via a preamplifier 70 to an input of a color separation circuit 72. On receiving a dot or pixel sequential video signal, at the input 74 the color separation circuit 72 functions to separate the input into respective colors such as red, R, green, G, and blue, B, according to a pixel clock received from the controller 24 on the signal line 32 so as to produce the resultant signals to outputs 82R, 82G, and 82B, respectively. The color separation is accomplished in accordance with the array of filter segments of the color filter 28 in the imaging device 22. An arbitrary array of filter segments may be employed.

The color signals thus separated are then fed to color balance adjuster circuit 76, which is a functional unit operative in reponse to a signal line 50 from the controller 24 for correcting a deviation of the white balance due to the color temperature of a light source employed in a shooting operation of the imaging device 22. In the solid-state imaging device 22, the sensitivity varies depending on the components of a light incident to each cell of the photosensitive cell array, and hence by adjusting the amplification gain to the signal components associated with the respective, separated colors, there is attained a uniform sensitivity for the respective, separated colors.

Figure 7:
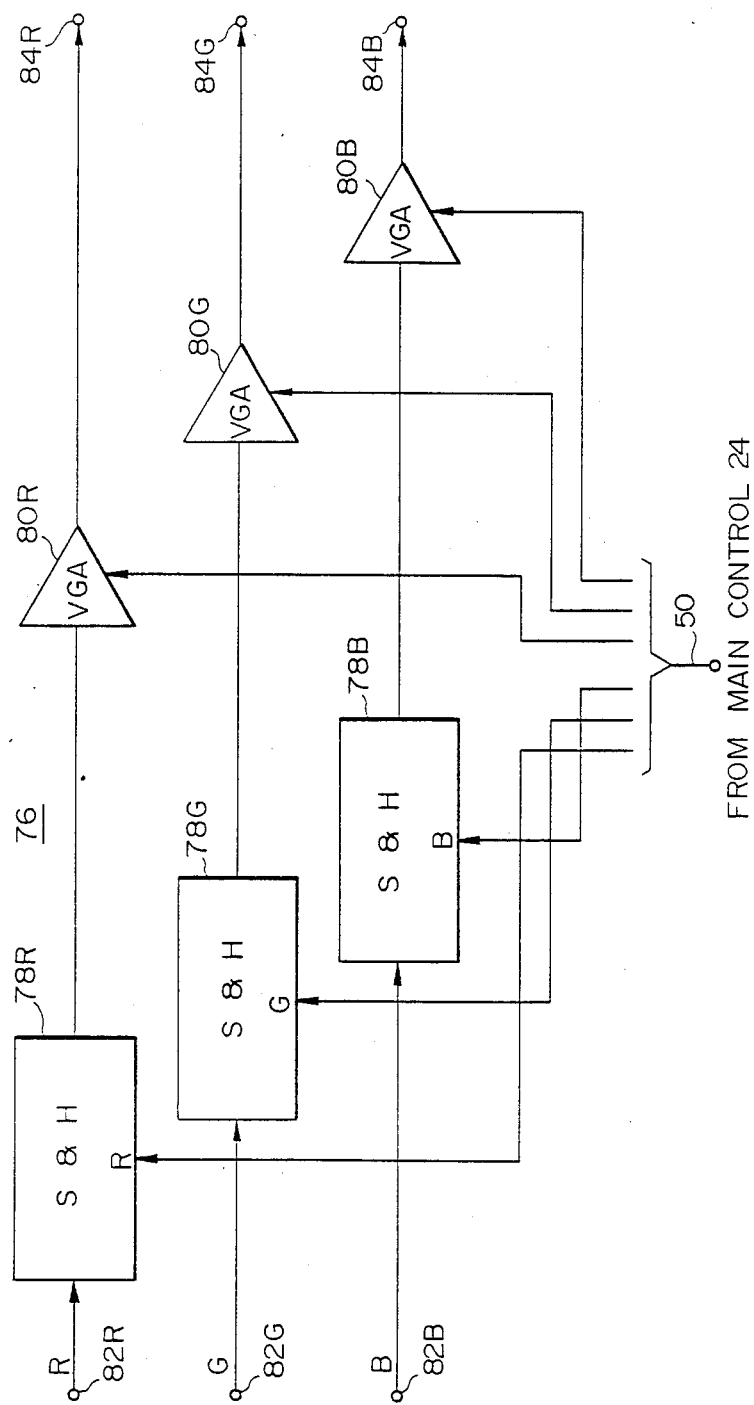
FIG. 7 is a functional diagram illustrating an example of a color balance adjusting circuit included in these embodiments.

The color balance adjusting circuit 76 of which the specific configuration is illustrating in FIG. 7 includes, respectively for the signals of three separated colors, samples and hold (S&H) circuits 78R, 78G and 78B and variable gain amplifiers 80R, 80G and 80B. These components are connected as illustrating in the figure. The signals 82R, 82G and 82B produced by separating the signal 74 into three separated color components associated with R, G and B components by the color separation circuit 72 are respectively sampled by the sample and hold circuits 78R, 78G and 78B so as to be held therein for a predetermined period of time, corresponding to three pixels in this embodiment.

The component signals held in the sample and hold circuits 78R, 78G, and 78B are amplified by the variable gain amplifiers 80R, 80G and 80B so as to be fed to outputs 84R, 84G and 84G, respectively. The respective amplification gains of the variable gain amplifiers 80R, 80G and 80B are variably controlled by a control signal from the control line 50. Adjustment is effected will be described as follows. That is, when a white color image is shot by the imaging device 22, the average level of video signals obtained from color segments of the color filter 28 having a low transmissivity with respect to the incident light, for example, from the R and B photosensitive cells is adjusted to be substantially identical to the level of a signal attained from the other segment, namely, the G segment. Furthermore, a correction is achieved for a deviation of the white balance due to color temperature of the light source used in the shooting operation of the imaging device 22.

Returning to FIG. 1, the color signals of which the color balance is adjusted by the color balance adjusting circuit 76 are fed to a gamma, $\gamma$, correction circuit 86, which functions as a gradation correction to compensate for a shift in a gradation caused, for example, by a nonlinear characteristic of the imaging device 22. In general, the gradation is corrected such that the effect thereof is emphasized on a low-level signal as compared with signals having a higher level. An instruction of the gradation correction is supplied from the main control 24 over a control line 91 to the $\gamma$ correction circuit 86, which produces resultant signals to outputs 88R, 88G and 88B. Furthermore, there may be added a color difference signal generator to produce a color difference signal if necessary.

The outputs 88R, 88G and 88B of the $\gamma$ correction circuit 86 are connected to a switch circuit 56, which produces an output 58 linked to an analog-to-digital converter, ADC 62. The switch circuit 56 is a selector for selecting either one of three selective connecting positions in response to a control output 60 from the controller 24, which supplies the control line 60 with a switching signal associated with a pixel clock. As a consequence, the switch circuit 56 supplies an output port 58 in a dot sequential fashion with the color-separated signals R, G and B respectively received from the $\gamma$ correction circuit 86 via three outputs 88R, 88G and 88B or a luminance signal Y and color difference signals R-Y and B-Y, namely, component signals.

The analog-to-digital converter 62 converts a video signal received in an analog form from the input 58 into associated 8-bit digital data to be fed to an output 64 thereof, which is linked to an orthogonal transformer 102 as illustrated in FIG. 2.

The orthogonal transformation circuit 102 is a circuit to effect an orthogonal transformation on video signal data to obtain data in frequency region. In this embodiment, the orthogonal transformer 102 accomplishes the orthogonal transformation on video signal data for the respective blocks of the same size into which a full picture area represented by the video signal data is subdivided. As the orthogonal transformation, there is advantageously adopted the Hadamard transformation, the Fourier transformation, or the cosine transformation.

Data having the orthogonal transformation performed thereon is fed to an encoder 106, which achieves an encoding thereof suitable for the video signal data. The encoding is effected such that, for example, a greater number of bits are allocated to a component having the lower frequencey. The data 108 encoded by the encoder 106 is linked to the connector 14 of this apparatus.

The digital data thus compressed is written via the connector 14 and the data line 92 into the memory 90. A prediction encoding may be employed in the data compression method, in addition to the orthogonal transformation and encoding. The data compression as described above enables the storage locations of the memory 90 to be efficiently untilized. Incidentally, the system may be configured such that without accomplishing the data compression, the video signal data is written in the form of pixel-sequential video signal data.

The main control 24 is a control data unit to control the overall operation of this apparatus in response to instruction signals from an operation and display 44 via a signal line 52 and delivers control signals respectively via a control line 46 to the sync greater generator 30, the control line 26 to the imaging section 12, a control line 48 to the analog-to-digital converter 62, the control line 50 to the color balance adjuster 76, the signal line 91 to the $\gamma$ correction circuit 86, a signal line 100 to the orthogonal transformer circuit 102, and the signal line 62 to the switch circuit 56. In addition, the control circuit 24 supervises the status of the respective elements by the control lines 46, 26, 48, 50, 100, and 91.

Furthermore, the controller 24 functions primarily control the write operation of the memory 90 and is hence connected to a control bus 54 for conveying the write address, write enable, chip select, and clock signals.

The sync generator 30 drives, under the control of the signals on line 46 from the controller 24, the image device 22 so as to supply the output 32 thereof with drive signals such as clock and address signals necessary to cause the imaging device 22 to produce a video signal from the output 34 thereof. The drive signals are also fed to the color separation circuit 72.

The operation and display unit 44 having various maunal operation keys such as a shutter release button, an automatic/manual setting button, an exposure setting button, and a white balance adjusting button develops a function such that the operator inputs thereby instructions to the system so as to supply the instructions to the controller 24. Furthermore, the unit 44 receives a signal indicating the status of this system via a signal line 52 so as to display the status to the operator.

The operation of the operation and display 44 will be described next. First, after loading the camera 10 with the memory 90 by the connector 14, the operator manipulates the operation and display unit 44 to accomplish a shooting operation of an object. When the shutter release button is actuated, the shutter 20 is operated so as to shoot an object such that signals representative of a frame of the object image is produced from the imaging device 22, in response to a clock supplied from the sync generator 30 over the clock line 32, from the imaging device 22 to the output 34 in the form of the dot or pixel sequential video signal.

The controller 24 drives the analog-to-digital converter 62, the color balance adjuster 76, and the $\gamma$ correction circuit 86 in response to a sync signal produced from the sync generator 30. The dot sequential video signal is thereafter supplied in the form of an analog signal to the color separation circuit 72, which for example, separates the signal into R, G and B color signals so as to undergo a color balance adjustment in the color balance adjuster 76 and a $\gamma$ characteristic correction in the $\gamma$ correction circuit 86. The video signal subjected to the various signal processings as described above is then supplied from the $\gamma$ correction circuit 86 to the switch circuit 56 in the form of the R, G and B color component signals or of the luminance signal Y and the color difference signals R-Y and B-Y, namely, in the form of component signal data.

The controller 24 produces a switching signal timed with a pixel clock to the control line of the switch circuit 56, which supplies the input 58 of the analog-to-digital converter 62 in a dot sequential manner with the component signals attained from the three outputs 88R, 88G and 88B of the $\gamma$ correction circuit 86. The dot sequential video signals are converted into corresponding digital data in the analog-to-digital converter 62 such that the digital data is supplied to the orthogonal transformer 102 and then is encoded by the encoder 106. Image data 108 attained through the data compression is fed via the connector 14 to the data line 92 of the memory 90.

The control circuit 24 at the same time produces control signals which include the write address, the write enable, the chip select, and the clock signals on the control line 54 to the memory 90. In synchronism therewith, image data supplied to the data line 92 are sequentially written into sequential storage locations of the memory 90. A frame of video signal data is thus stored in storage locations of the memory 90. The video signals stored in the memory as described above is reproduced by a playback apparatus.

According to the embodiment described above, prior to an analog-to-digital conversion in the analog-to-digital converter 62, video signal processing operations such as the color balance adjustment and the gradation corrections are to be effected. In the white balance adjustor 76, when a white color is shot by use of the imaging device, the relative amplification gains respectively of the three separated colors R, G and B are controlled so as to be substantially identical to each other. As a consequence, an effective use of the dynamic range is realized in the analog-to-digital converter 62.

According to the conventional method, since the operations of video signal processing described above are accomplished prior to the analog-to-digital conversion, if the ratio between levels of the R, G and B signals obtained through a shooting operation of a white color is, for example, 0.6 : 1 : 0.3, only an input of 0.3 is attained for the B signal even when the dynamic range is set to the maximum value for the analog-to-digital conversion of the G signal. As a result, it is possible to develop a large S/N for the B signal which is a disadvantage.

In addition, the gradation correction is conducted before the analog-to-digital conversion according to the present invention. Thereby, the excessive emphasis on the quantization error occurring on a low-level video signal in the conventional technology is prevented.

Figure 3:
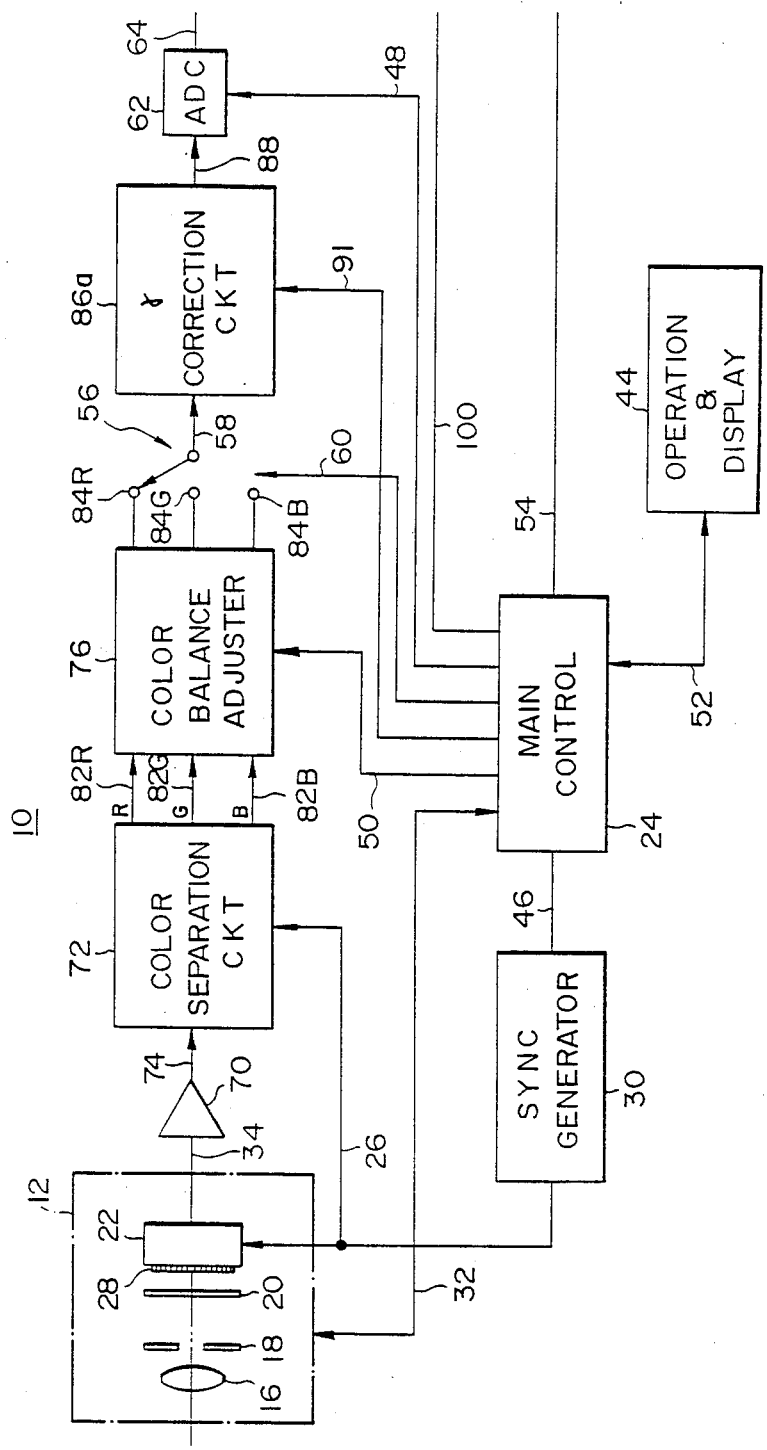
FIGS. 3 through 6 are functional block diagrams, similar to FIGS. 1 and 2, illustrating alternative embodiments of a digital electronic still camera according to the present invention.

An alternative embodiment of a digital electronic still camera according to the present invention, illustrated in FIG. 3, differs from that shown in FIG. 1 in that three outputs 84R, 84G and 84B of a color balance adjuster 76 are connected to a switch circuit 56, which has an output 58 linked to an input of a γ correction circuit 86a effecting a γ correction on the dot sequential video signals. Consequently, the switch circuit 56 develops component signals attained at the three outputs from the color balance adjusting circuit 76 to the γ correction circuit 86a in the dot sequential fashion. The γ correction circuit 86a achieves a gradation correction on the dot sequential signals so as to supply an output 88 to an analog-to-digital converter 62. In the subsequent figures, similar components are assigned with the same reference numerals. In addition, signal lines 64 and 100 are connected to the circuit illustrated in FIG. 2.

Figure 4:
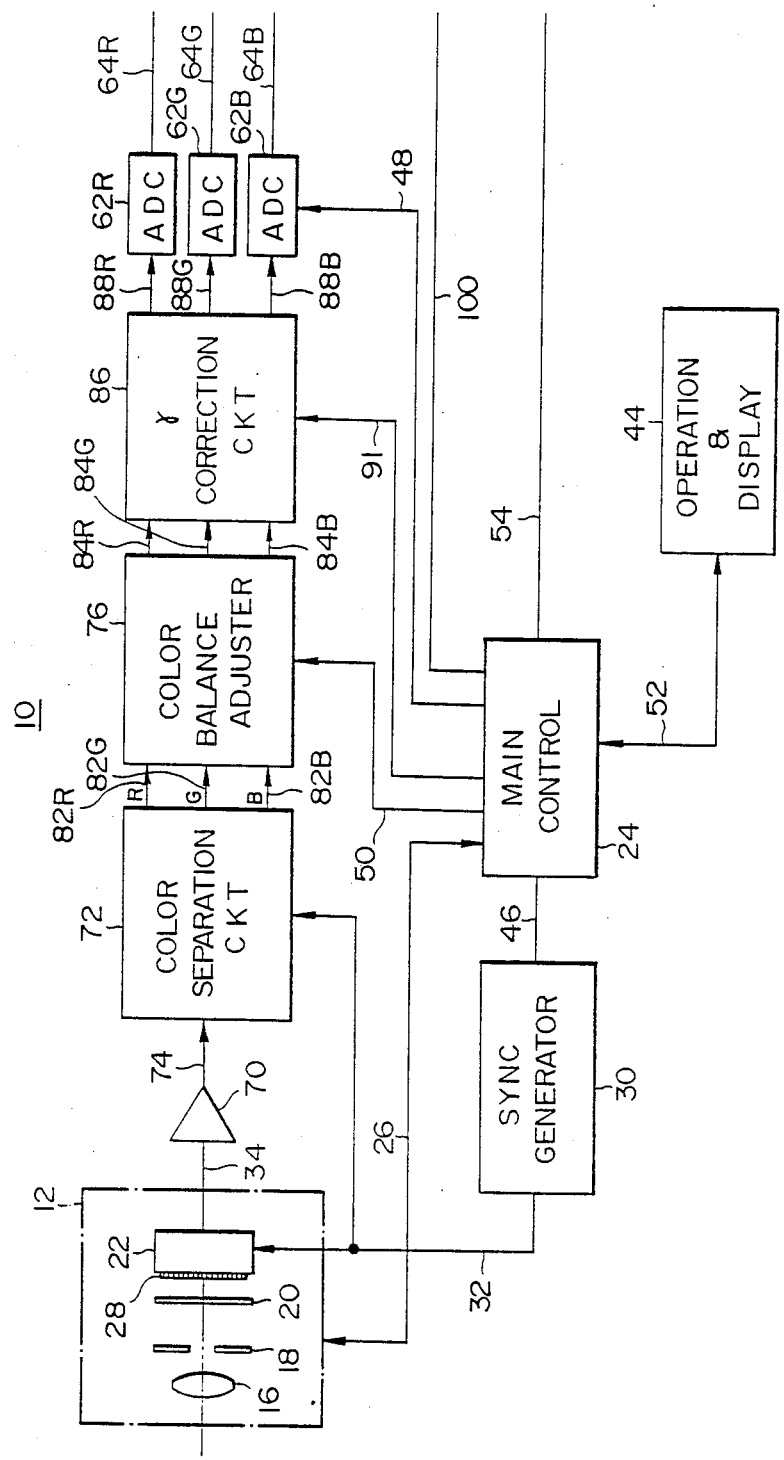
Figure 5:
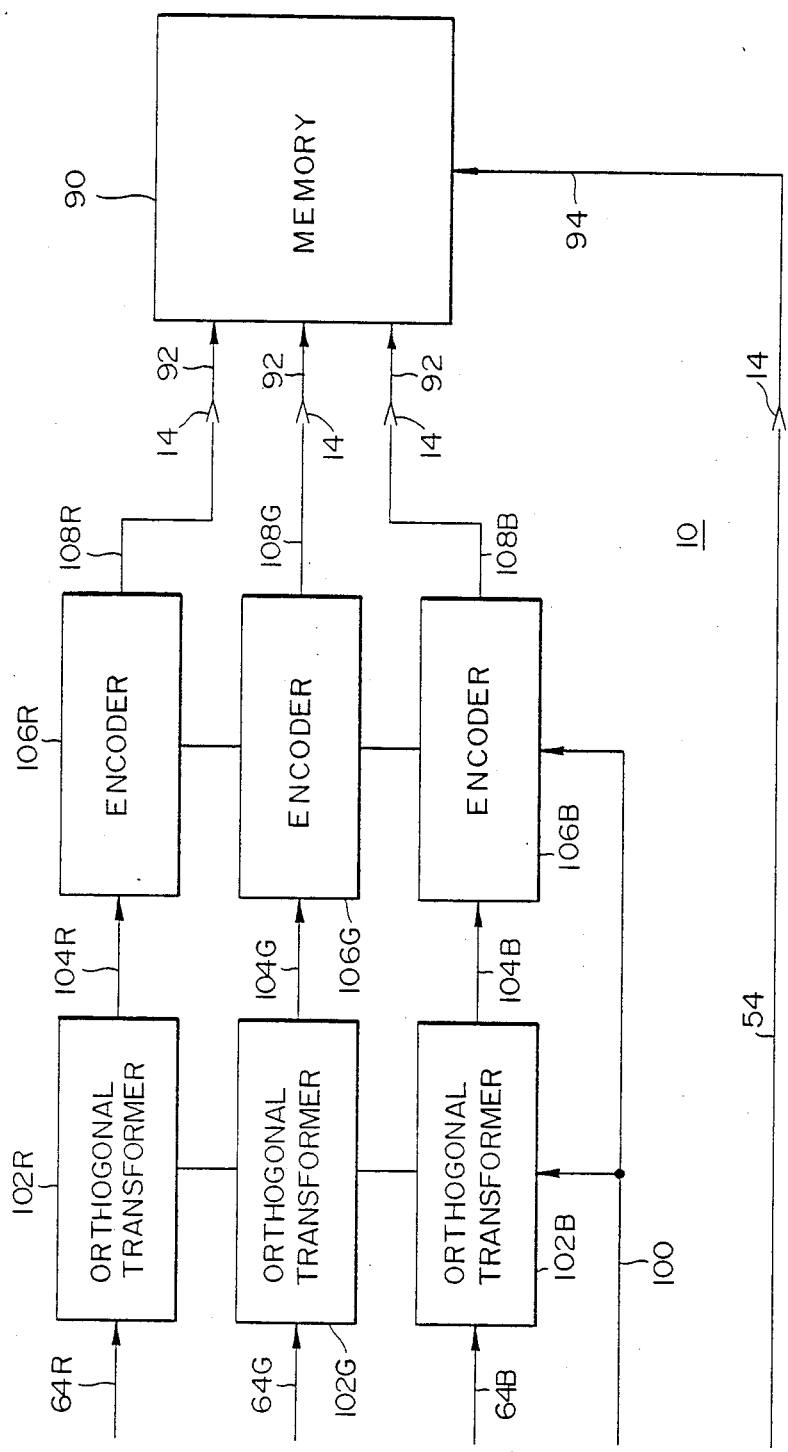

Further alternatively embodiments according to the present invention illustrated in FIGS. 4 and 5 are different from the embodiments of FIGS. 1 and 2 because the three component signal outputs 88R, and 88G and 88B from the γ correction circuit 86 are respectively connected to three analog-to-digital converters 62R, 62G and 62B without disposing the switch circuit 56. As a consequence, outputs 64R, 64G and 64B from the three analog-to-digital converters 62R, 62G and 62B are directly transferred over three lines via connectors 14 to orthogonal transformers 102R, 102G and 102B, respectively.

The circuit illustrated in FIG. 5 is substantially similar to the circuit of FIG. 2 except that orthogonal converters and encoders are respectively disposed in association with three separated colors. Components associated with three separated colors R, G and B are represented with reference numerals assigned with subscripts R, G and B, respectively.

Figure 6:
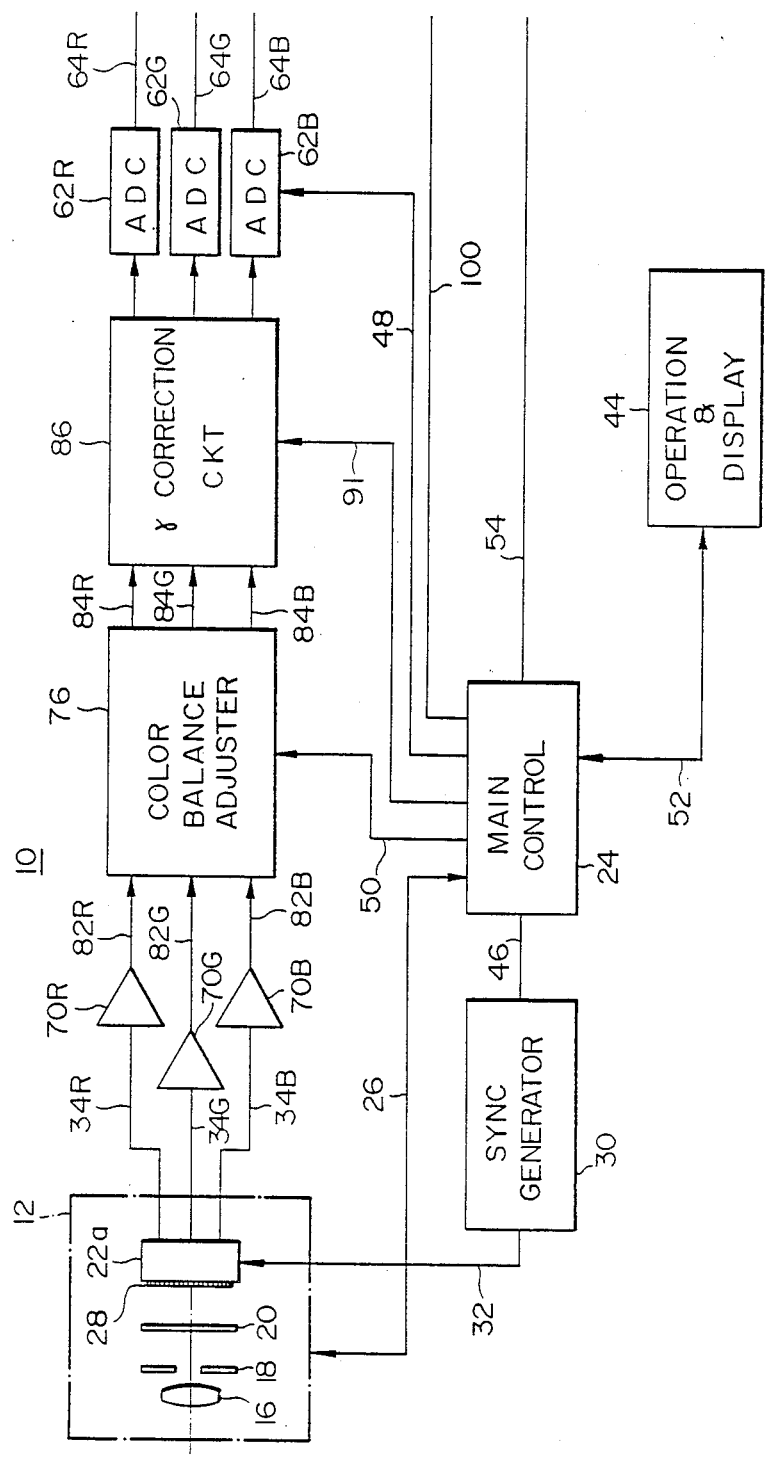

The embodiment of FIG. 6 is different from the other embodiments because the color solid-state imaging device 22a produces three separated color signals on three lines in a parallel fashion. In this embodiment, from the solid-state imaging device 22a, for example, R, G and B component signals are respectively fed to outputs 34R, 34G and 34B so as to be respectively delivered via preamplifiers 70R. 70G and 70B to inputs 82R, 82G and 82B of a color balance adjuster 76. As a consequence, the color separation circuit 72 is not disposed. The signal lines 64R, 64G, 64B, 100, and 54 of FIG. 6 are connected to the circuit of FIG. 5.

In all embodiments described above, the video signal processing is carried out prior to the analog-to-digital conversion of the video signal. Consequently, the dynamic range of the analog-to-digital convertor is effectively utilized in association with the color balance adjustment. Furthermore, even when the gradation control is achieved, the quantization error for the low-level signal is not cumulatively emphasized.

According to the present invention as described above, when an analog video signal is to be stored in a digital memory, operations on video signals such as a color balance adjustment and a gradation correction are accomplished before the video signal is converted into a digital signal. As a consequence, the dynamic range of the analog-to-digital converter is effectively utilized in association with the color balance adjustment. Furthermore, even when the gradation adjustment is achieved, the quantization error for the low-level signal is not excessively emphasized. As a result, through an appropriate video signal processing, there is recorded a high-quality picture. In addition, because the video signal processing described above is carried out on the side of a recording apparatus, the constitution of the playback apparatus is simplified.

While the present invention has been described with reference to the particular illustrative embodiments, it is not restricted by those embodiments but only by the appended claims. It is to be appreciated that those skilled in the art can change or modify the embodiments without departing from the scope and spirit of the present invention.

What is claimed is:

1. A digital electronic still camera having a video signal representative of a still picture and stored in the form of digital data comprising:
   imaging means including an imaging device having an array of photosensitive cells on which a color filter having separated-color segments is arranged for capturing an image of a target scene to produce a video signal representing the image;
   color balance adjusting means for adjusting a color balance of the video signal produced from imaging means;
   gradation correcting means for correcting a gradation of the video signal developed by the color balance adjusting means;
   signal converting means for converting the video signal produced from said gradation correcting means into a digital signal and outputting the digital signal; and
   control means for controlling said imaging means; said color balance adusting means, said gradation correcting means and said signal converting means to effect an imaging operation, a color balance adjustment, a gradation correction and a conversion of the video signal into the digital signal, and to produce a control signal for causing the digital signal to be stored.

2. A digital electronic still camera in accordance with claim 1, further comprising switch means operative under the control of said control means for converting the video signal supplied from said gradation correcting means into a dot sequential signal and delivering dot sequential signal to said signal converting means.

3. A digital electronic still camera in accordance with claim 1, further comprising switch means operative under the control of said control means for converting the video signal supplied from said color balance adjusting means into a dot sequential signal and delivering dot sequential signal to said gradation correcting means.

4. A digital electronic still camera in accordance with claim 1, further comprising color separating means for separating a dot sequential video signal produced from said imaging means into component signals associated with separated colors of said color filter segments and supplying the component signals to said color balance adjusting segments.

wherein said imaging means developes the video signal in a dot sequential fashion.

5. A digital electronic still camera in accordance with claim 1, wherein said imaging means supplies the video signal to said color balance adjusting means in a parallel fashion associated with the separated colors of said color filter segments.

6. A digital electronic still camera in accordance with claim 1, further comprising connecting means for detachably connecting to said signal converting means a semiconductor storage module in which the digital signal is stored therein in response to the control signal.

7. A digital electronic still camera in accordance with claim 1, further comprising signal transforming means for effecting an orthogonal transformation on the digital signal produced from said signal converting means, and encoding the digital signal developed from the orthogonal transformation.

8. A digital electronic still camera having a video signal representative of a still picture and stored in the form of digital data, comprising:
 imaging means including an imaging device having an array of photosensitive cells on which a color filter having separated-color segments is arranged for capturing an image of a target scene to produce an analog video signal representing the image in a dot sequential fashion;
 color separating means for separating the analog video signal produced from said imaging means into a component signal associated with separated colors of said color filter segments;
 color balance adjusting means for adjusting a color balance of the component signal produced from said color separating means;
 gradation correcting means for correcting a gradation of a video signal produced form said color balance adjusting means;
 signal converting means for converting the video signal produced from said gradation correcting means into a corresponding digital signal to produce the digital signal; and
 control means for controlling said imaging means, said color separating means, said color balance adjusting means, said gradation correcting means and said signal converting means to effect an imaging operation, a color separation, a color balance adjustment, a gradation correction and a conversion of the video signal into the digital signal, and to produce a control signal for causing the digital signal to be stored.

9. A digital electronic still camera in accordance with claim 8, further comprising switch means operative under the control of said control means for converting the video signal supplied from said gradation correcting means into a dot sequential signal and delivering the dot sequential signal to said signal converting means.

10. A digital electronic still camera in accordance with claim 8, further comprising switch means operative under the control means for converting the video signal supplied from said color balance adjusting means into a dot sequential signal and delivering the dot sequential signal to said gradation correcting means.

11. A digital electronic still camera in accordance with claim 8, further comprising orthogonal transformer means operative under the control of said control means for conducting an orthogonal transformation onto the digital signal supplied from said signal converting means, and encoding the digital signal developed from then orthogonal transformation.

12. A digital electronic still camera in accordance with claim 8, further comprising connecting means for detachably connecting to said signal converting means a semiconductor storage module in which the digital signal is stored therein in response to the control signal.

13. A digital electronic still camera in accordance with claim 8, wherein said component signal comprises red, green and blue components.

14. A digital electronic still camera having a video signal representative of a still picture and stored in the form of digital data, comprising:
 imaging means including an imaging device having an array of photosensitive cells on which a color filter having separated-color segments is arranged for capturing an image of a target scene to produce an analog video signal representing the image in a parallel fashion associated with the separated colors of said color filter segments;
 color balance adjusting means for adjusting a color balance of the component signal produced from said imaging means;
 gradation correcting means for correcting a gradation of a video signal produced from said color balance adjusting means;
 signal converting means for converting the video signal produced from said gradation correcting means into a corresponding digital signal to produce the digital signal; and
 control means for controlling said imaging means, said color balance adjusting means, said gradation correcting means and said signal converting means to effect an imaging operation, a color balance adjustment, a gradation correction and a conversion of the video signal into the digital signal, and to produce a control signal for causing the digital signal, and to produce a control signal for causing the digital signal to be stored.

15. A digital electronic still camera in accordance with claim 14, further comprising switch means operative under the control of said control means for converting the video signal supplied from said gradation correcting means into a dot sequential signal and delivering the dot sequential signal to said signal converting means.

16. A digital electronic still camera in accordance with claim 14, further comprising switch means operative under the control of said control means for converting the video signal supplied from said color balance adjusting means into a dot sequential signal and delivering the dot sequential signal to said gradation correcting means.

17. A digital electronic still camera in accordance with claim 14, further comprising orthogonal transformer means operative under the control of said control means for conducting an orthogonal transformation onto the digital signal supplied from said signal converting means, and encoding a digital signal developed from the orthogonal transformation.

18. A digital electronic still camera in accordance with claim 14, further comprising connecting means for detachably connecting to said signal converting means a semiconductor storage module in which the digital signal is stored therein in response to the control signal.

19. A digital electronic still camera in accordance with claim 14, wherein said component signal comprises red, green and blue components.

20. A digital electronic still camera having a video signal representative of a still picture and stored in the form of digital data, comprising:
   imaging means including an imaging device having an array of photosensitive cells on which a color filter having separated-color segments is arranged for capturing an image of a target scene to produce a video signal representing the image;
   color balance adjusting means for adjusting a color balance of the video signal produced from said imaging means;
   gradation correcting means for correcting a gradation of the video siganl developed by the color balance adjusting means;
   signal converting means for converting the video signal produced from said gradation correction means into a digital signal and outputting the digital signal;
   control means for controlling said imaging means, said color balance adjusting means, said gradation correcting means and said signal converting means to effect an imaging operation, a color balance adjustment, a gradation correction and a conversion of the video signal into the digital signal and to produce a control signal for causing the digital signal to be stored; and
   switch means operative under the control of said control means for converting the video signal supplied from said gradation correcting means into a dot sequential signal and delivering the dot sequential signal to said signal converting means.

21. A digital electronic still camera in accordance with claim 20, further comprising connecting means for detachably connecting to said signal converting means a semiconductor storage module in which the digital signal is stored therein in response to said control signal.

22. A digital electronic still camera in accordance with claim 20, further comprising signal transforming means for effecting an orthogonal transformation on the digital signal produced from said signal converting means and encoding the digital signal developed from the orthogonal transformation.

23. A method of storing a video signal representative of a still picture in the form of digital data by a digital electronic still camera, comprising the steps of:
   (a) capturing an image of a target scene to produce a video signal representing the image by imaging means including an imaging device having an array of photosensitive cells on which a color filter having separated-color segments is arranged;
   (b) adjusting a color balance of the video signal produced at said step (a);
   (c) correcting a gradation of the video signal adjusted at said step (a);
   (d) converting the video signal corrected at said step (c) into a digital signal;
   (e) controlling said steps (a)–(d) to effect an imaging operation, a color balance adjustment, a gradation correction and a conversion of the video signal into the digital signal; and
   (f) producing a control signal which stores the digital signal.

* * * * *